Patented Mar. 16, 1926.

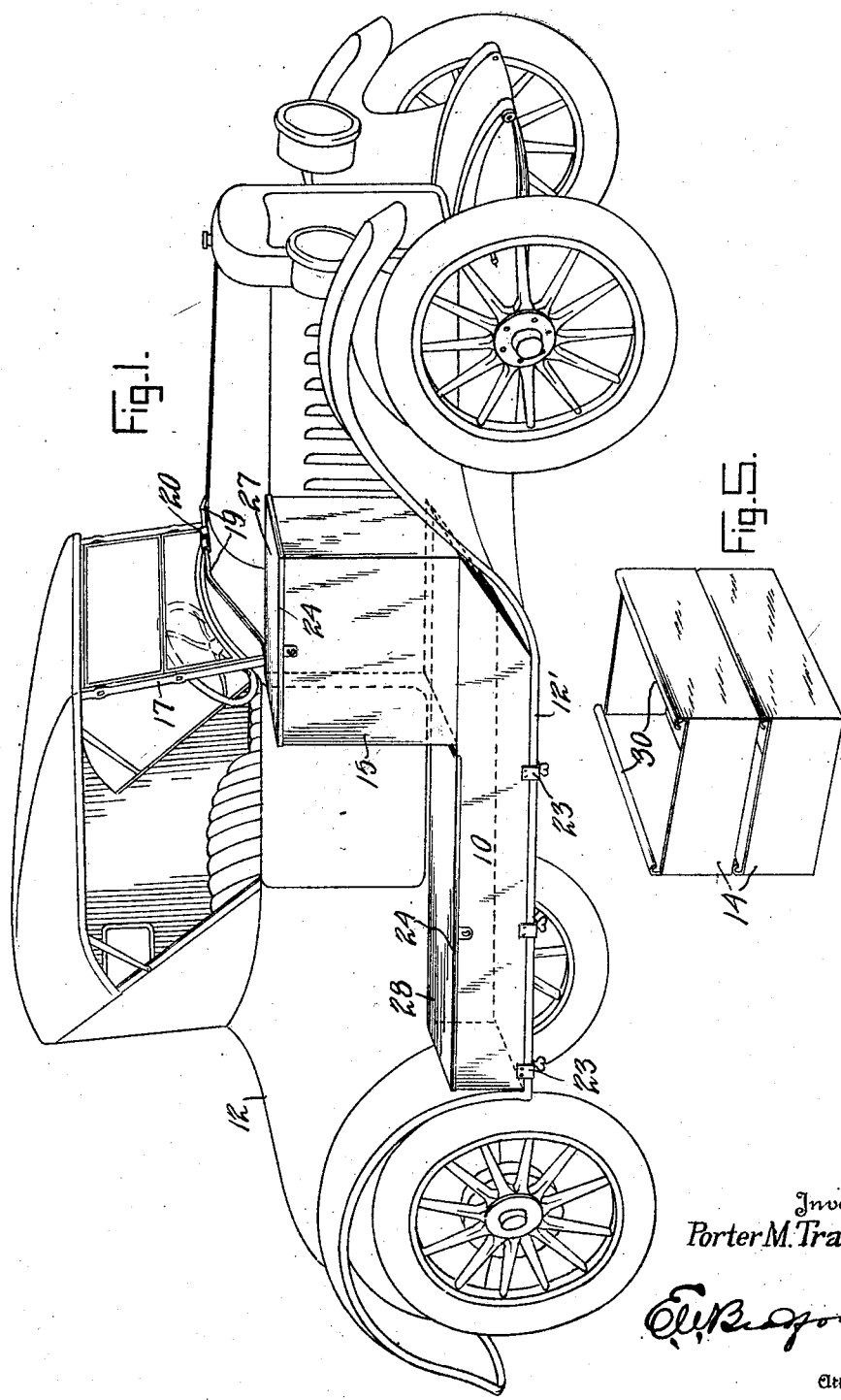

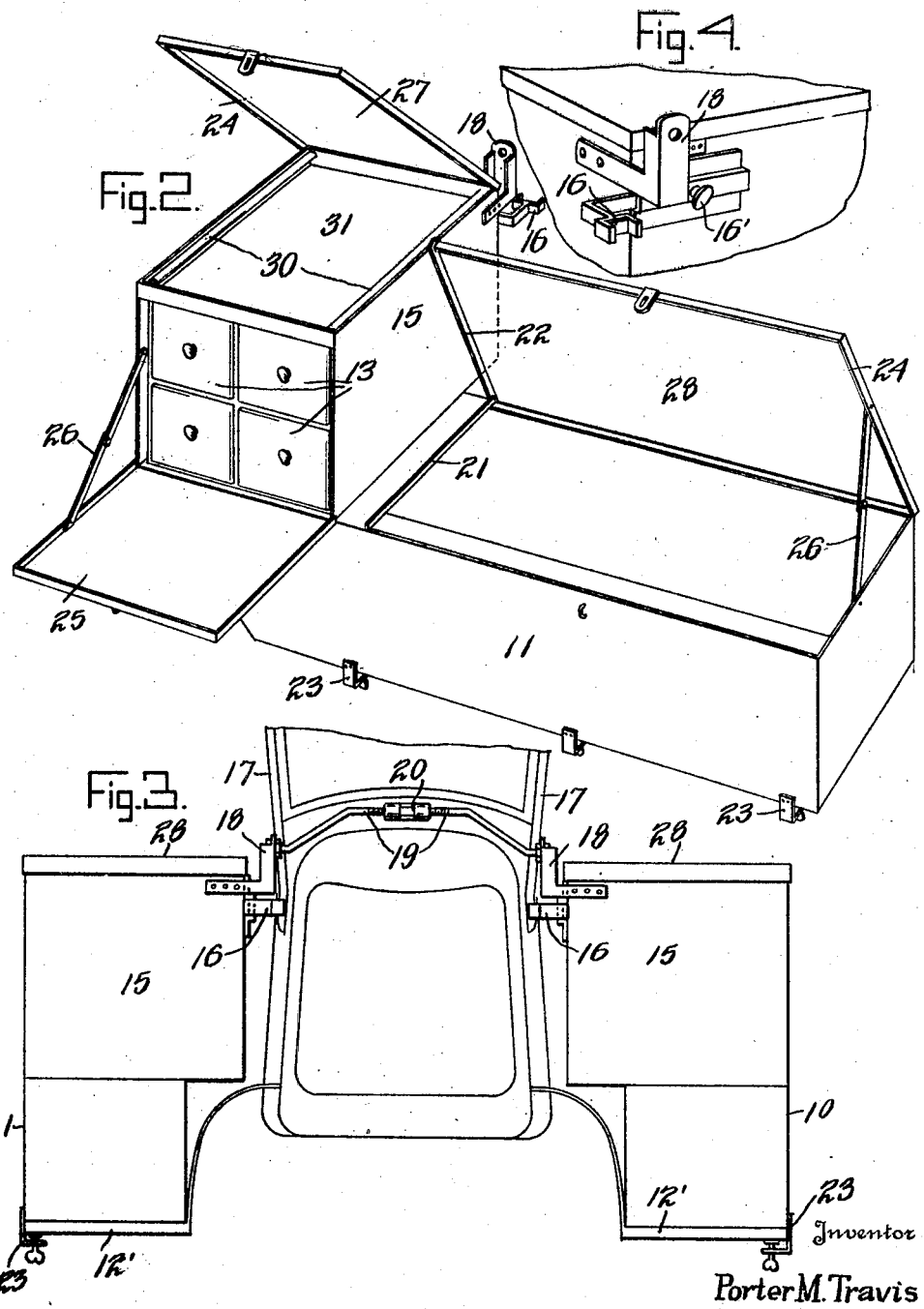

1,577,386

UNITED STATES PATENT OFFICE.

PORTER M. TRAVIS, OF SHERMAN, TEXAS.

LUGGAGE CARRIER.

Application filed June 16, 1925. Serial No. 37,443.

*To all whom it may concern:*

Be it known that I, PORTER M. TRAVIS, a citizen of the United States, residing at Sherman, in the county of Grayson and State of Texas, have invented certain new and useful Improvements in Luggage Carriers, of which the following is a specification.

My said invention relates to luggage carriers for automobiles and it is an object of the invention to provide a receptacle which will fit snugly upon the running board and having means for fastening the same in position thereon, the same being so constructed as not to interfere with parts of the automobile to which access is essential such as for example the doors and hood.

Another object of the invention is to provide a device of the above character in which different articles of unlike character, as for example provisions, bedding and luggage of various descriptions, may be stored and securely protected from the elements as well as each protected from the other.

Another object of the invention is to provide a device of the above character with means for fastening the same securely in position so as not to mar the paint or otherwise injure the automobile; to prevent rattling or vibration and to evenly distribute the load, thus insuring proper balance and consequent safety and ease of riding.

A still further object is to provide a device of the above character which may be unfolded and the trays removed to serve as a dressing cabinet, cooking table and the like.

Referring to the accompanying drawings, which are made a part hereof and on which similar reference characters indicate similar parts, Figure 1 is a perspective of an automobile showing my device applied thereto, Figure 2, a perspective of the partially open carrier designed for the left-hand side of the vehicle, Figure 3, a detail front plan view with the fenders removed showing the application of right and left hand carriers, Figure 4, a detail of the connection at one end of the connecting strap or rod shown in the upper portion of Figure 3, and Figure 5, a perspective of removable trays for use in the forward upright portion of the right-hand carrier.

The invention comprises a right-hand carrier 10 and a left-hand carrier 11 adapted to be secured respectively at the right and left sides of an automobile 12 to the running board 12' thereof. The carriers 10 and 11 are substantially of identical construction except they open on opposite sides and the left-hand carrier is provided with four trays or drawers 13 and the right-hand carrier is provided with only two trays or drawers 14 of larger size.

The carriers 10 and 11 are constructed preferably of sheet metal of sufficient weight and thickness to eliminate vibration and to hold the weight of a person entering or alighting from the automobile. The parts are securely fastened together by riveting, welding, or in any desired manner. The carrier body is of such proportions that when fastened in position on the running board the lower horizontally disposed or long narrow part will be substantially the length and width of the running board and will extend upward to a point just beneath the doors when open permitting said doors to freely open and close and touching no part of the body of the car as best shown in Figure 1. The forward upright part of the carrier 15 forms a separate compartment from the lower horizontal compartment having its bottom preferably on a level with the top of the lower compartment and extending upward for a height substantially equal to the height of the cowl of the automobile. The upper and lower portions of each carrier being preferably provided with lids 27 and 28.

The upright portion 15 is provided at its rear with an adjustable brace or bracket 16 for contact with the windshield stanchion 17 and adapted to be held by a set screw 16' and with a second brace or bracket 18 adapted to be connected with a similar bracket on the cabinet on the opposite side of the machine by means of a two-part connecting rod or bar 19 provided with a turn buckle 20 for adjusting the same to the proper tension. When used with a closed car a bracket having a flat end is preferable instead of one having a cupped end as shown, each of said brackets being preferably provided with a rubber or other flexible buffer to prevent injury to the automobile. By this construction and method of fastening the weight is supported equally by the running boards, vibration is prevented, the carriers are held away from the car body and the dead weight is lifted from the outer edge of the running board and distributed evenly along the inside of the same and directly against the frame of the automobile. Thus any possible damage to the chassis or to the engine from pulling an unbalanced load is prevented. From my experience I have found that an automobile equipped with my device is much easier to control on wet or rough streets and does not swing or skid and provides comfortable riding to the occupants.

The upper portion 15 of the cabinet is riveted to the lower portion thereof and is further provided with a plate extending outward beyond its lower edge and upturned at its end 21 for cooperation with a cupped extremity 22 on the lid of the lower portion of the cabinet, said cupped portion preventing the entrance of water or the like into the carrier when in position on the running board of the vehicle. Secured to the outer edge of the cabinet at the bottom thereof are a plurality of fastening clamps 23 which may be of the conventional type having L-shaped bodies through which are mounted screws with swivel heads adapted to engage the underside of the running board upon which the cabinet is mounted. The lids of the cabinets are provided with depending rims 24 in order to prevent the entrance of water and the like thereinto and said rims fit snugly over the cabinets and the rim of the upper cabinet lid engages the front 25 and holds the same in position, said front is provided with a collapsible support 26 permitting the front of the cabinet to drop to a horizontal position to serve as a table. The lid of the lower cabinet is also provided with a collapsible bracket 26 which serves to hold the same upright.

The interior of the cabinets may contain shelves or drawers to meet with the individual taste of the person using the same, however, I find a desirable arrangement includes a pair of larger drawers 13 in the right carrier and as shown in Figure 5, while on the other side I preferably provide a greater number having shown four drawers 14 which may contain smaller articles. The trays or drawers 13 are turned over and inwardly at their upper edges to provide hand grips 30, each of said trays being independent of the other while the trays 14 are contained in a removable case 31 having its upper edges turned inwardly to provide similar grips 30.

It will be obvious to those skilled in the art that my device may be modified in various ways without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. A luggage carrier for automobiles comprising a receptacle for each running board thereof and having a forward portion extending upward beside the cowl, means for fastening said upright portions together across said cowl comprising a connecting rod for engagement with each of said upright portions, and means for fastening each of said receptacles to its supporting running board, substantially as set forth.

2. A luggage carrier for automobiles comprising a receptacle for each running board extending along the same and of substantially the same width, each of said receptacles terminating short of the bottom of the adjacent door of the automobile and extending upward beside the cowl, and means for fastening said upright portions together across said cowl comprising a connecting rod for engagement with each of said upright portions, substantially as set forth.

3. A luggage carrier for automobiles comprising a receptacle having a horizontally disposed portion of substantially the length and breadth of the running board of an automobile and terminating below the bottom of the door thereof, a lid for said portion having a cupped extremity, an upright cabinet mounted on the forward end of said horizontally disposed portion, a lid for said upright cabinet, an extension on the under side of said cabinet extending under the lid for the horizontally disposed portion and having an upturned extremity adapted to fit into the cupped extremity of the lid for the horizontally disposed portion, substantially as set forth.

4. A luggage carrier for automobiles comprising a receptacle for each running board thereof and having a forward portion extending upward beside the cowl, means for fastening said upright portions together across said cowl comprising a connecting rod for engagement with each of said upright portions, means for fastening each of said receptacles to its supporting running board, and means for holding the upper portion of each of said receptacles spaced from the adjacent portion of the automobile, substantially as set forth.

5. A luggage carrier for automobiles comprising a receptacle for each running board extending along the same and of substantially the same width, each of said receptacles terminating short of the bottom of the adjacent door of the automobile and extending upward beside the cowl, means for fastening said upright portions together across said cowl comprising a connecting rod for engagement with each of said upright portions, and means for holding the upper portion of each of said receptacles spaced from the adjacent portion of the automobile, substantially as set forth.

6. A luggage carrier for automobiles comprising a receptacle having a horizontally disposed portion of substantially the length and breadth of the running board of an automobile and terminating below the bottom of the door thereof, a lid for said portion having a cupped extremity, an upright cabinet mounted on the forward end of said horizontally disposed portion, a lid for said upright cabinet, an extension on the under side of said cabinet extending under the lid for the horizontally disposed portion and having an upturned extremity adapted to fit into the cupped extremity of the lid for the horizontally disposed portion, and means for holding the upper portion of each of said receptacles spaced from the adjacent portion of the automobile, substantially as set forth.

7. A luggage carrier comprising a flat body of substantial length, a cover for said body, an upright body on one end of said flat body and having a portion extending under the cover for said flat portion, a drop front for said upright body, and a plurality of trays in said upright portion, substantially as set forth.

8. A luggage carrier comprising a flat body of substantial length, a cover for said body, an upright body on one end of said flat body and having a portion extending under the cover for said flat portion, a drop front for said upright body, a plurality of trays in said upright portion, and clamps secured on the under side of said flat body for securing the same to a ledge, substantially as set forth.

In witness whereof, I have hereunto set my hand and seal at Sherman, Texas, this 12th day of June, A. D. nineteen hundred and twenty-five.

PORTER M. TRAVIS. [L. S.]